United States Patent [19]

Okada et al.

[11] Patent Number: 5,412,024
[45] Date of Patent: May 2, 1995

[54] THERMOPLASTIC RESIN COMPOSITION

[75] Inventors: Akihiko Okada, Ichihara; Shuji Machida, Sodegaura, both of Japan

[73] Assignee: Idemitsu Kosan Co., Ltd., Tokyo, Japan

[21] Appl. No.: 865,457

[22] Filed: Apr. 9, 1992

[30] Foreign Application Priority Data

Apr. 9, 1991 [JP] Japan .................................. 3-076008

[51] Int. Cl.⁶ ............................................ C08L 25//06
[52] U.S. Cl. ................................... 524/577; 524/578; 524/494; 524/496; 525/333.3
[58] Field of Search ............... 524/577, 578, 494, 496; 525/333.3

[56] References Cited

U.S. PATENT DOCUMENTS

| | | | |
|---|---|---|---|
| 3,070,579 | 12/1962 | Szware | 525/333.3 |
| 3,108,994 | 10/1963 | Zelinski et al. | 525/355 |
| 3,135,716 | 6/1964 | Uraneck et al. | 525/122 |
| 3,175,997 | 3/1965 | Hsieh | 525/385 |

FOREIGN PATENT DOCUMENTS

| | | |
|---|---|---|
| 0422495 | 4/1991 | European Pat. Off. . |
| 0430109 | 6/1991 | European Pat. Off. . |
| 49-19097 | 2/1974 | Japan . |
| 55-161836 | 12/1980 | Japan . |
| 62-257948 | 11/1987 | Japan . |
| 2258855 | 10/1990 | Japan . |
| 1285747 | 8/1972 | United Kingdom . |

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

There is disclosed a thermoplastic resin composition which comprises a terminal-modified styrenic polymer having syndiotactic configuration the terminal of which is bonded to a compound having a polar group or a composition of the above terminal-modified styrenic polymer and a terminal-unmodified styrenic polymer having syndiotactic configuration, and an inorganic filler. The composition of the present invention is excellent in resistances to water, impact and heat as well as in mechanical properties and adhesivity with inorganic fillers without impairing the crystallization of the styrenic polymer having syndiotactic configuration.

16 Claims, No Drawings

THERMOPLASTIC RESIN COMPOSITION

BACKGROUND OF THE INVENTION

1. Field of the Invention

The present invention relates to a thermoplastic resin composition. More particularly, it pertains to a thermoplastic resin composition well suited for the formation of industrial materials such as electric and electronic materials, industrial construction material, automobile parts and domestic electrical appliances.

2. Description of the Related Arts

Various thermoplastic resins have heretofore been improved in dynamical properties and heat resistance by compounding therein an inorganic filler such as glass fiber. However, since a styrenic polymer has not sufficient adhesivity with an inorganic filler, investigation has been made on additives and surface treatment agents for inorganic fillers for the purpose of improving the aforementioned adhesivity. As a result, there have heretofore been developed the surface treatment agents such as the combination of various aminosilane compounds with polyester-based, urethanic, epoxy, acrylic or vinyl acetate-based resin and the additives such as maleic anhydride/styrene copolymer. Specifically there are known silane-based coupling agent etc. as a surface treatment agent for glass fiber and the composition of styrene/maleic anhydride -styrene copolymer/glass fiber as a composition compounded with an additive, etc. (refer to Japanese Patent Application Laid-Open Nos. 161836/1980 and 19097/1974). Nevertheless, the above-mentioned surface treatment agents and additives have failed to exhibit sufficient improvement effect.

On the other hand there are proposed a resin composition excellent in heat resistance and dynamical properties comprising a syndiotactic polystyrene compounded with an inorganic filler (Japanese Patent Application Laid-Open No. 257948/1987) and that comprising a syndiotactic polystyrene and a thermoplastic resin and/or rubber compounded with an inorganic filler (Japanese Patent Application Laid-Open No. 258855/1990). The above-mentioned compositions, however, have left still some room for improvement because of the inadequate adhesivity between the syndiotactic polystyrene and inorganic filler.

In the case of the latter, there has been used a composition of a syndiotactic polystyrene with an atactic polystyrene and polypenylene ether both being compatible therewith as the skeleton, but the latter two units have been poor in heat resistance compared with syndiotactic polystyrene (SPS) with the possibility of impairing crystallization.

SUMMARY OF THE INVENTION

It is the general object of the present invention to provide an adhesive which is excellent in resistances to water, impact and heat as well as mechanical properties and adhesivity with inorganic fillers without impairing the crystallization of SPS.

It is another object of the present invention to provide a composition comprising a syndiotactic polystyrene and an inorganic filler bonded to each other by the above adhesive.

As the result of intensive research and invenstigation made by the present inventors for the purpose of attaining the above-mentioned object, it has been found that the aforesated objects can be achieved by compounding a specific styrenic polymer having a modified terminal with an inorganic filler in a prescribed ratio. The present invention has been accomplished on the basis of the above-described finding and information.

Specifically, the present invention provides a thermoplastic resin composition which comprises 100 parts by weight of (A) (a) a terminal-modified styrenic polymer having syndiotactic configuration, a terminal of which is bonded to a compound having a polar group or (b) said terminal-modified styrenic polymer and a styrenic polymer having syndiotactic configuration; and 1 to 350 parts by weight of (B) an inorganic filler.

In the present invention, the terminal-modified styrenic polymer is a terminal-modified styrenic polymer having syndiotactic configuration, a terminal of which is bonded to a compound having a polar group.

Here, the styrenic polymer which has syndiotactic configuration means that its stereochemical structure is of syndiotactic configuration, i,e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such sundiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the abovementioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained is deteriorated thereby in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

The above-mentioned compound having a polar group bonded to the terminal of the styrenic polymer is derived from a compound having both a polar group and an unsaturated group in the same molecule before bonded to the styrenic polymer. The unsaturated group includes carbon-carbon double bond and carbon-carbon triple bond, and the polar group includes carboxyl group, a group derived from a carboxylic acid exemplified by various salts and esters formed by replacement of hydrogen atom or hydroxyl group of carboxyl group, acid amide; acid anhydride, imide, acid azide, halogenated acid, oxazoline, nitrile, epoxy group, amino group, hydroxyl group and isocyanic acid ester.

Major examples of the compound having a polar group and an unsaturated group include unsaturated carboxylic acid, derivatives thereof, unsaturated epoxy compounds, unsaturated alcohol, unsaturated amine and unsaturated isocyanic acid esters, specifically exemplified by maleic anhydride, maleic acid, fumaric acid, maleimide, maleic hydrazide and a reaction product of maleic acid and diamine represented by, for example, the constitutional formula

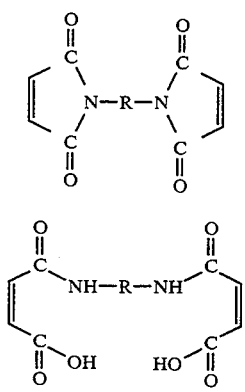

wherein R is an aliphatic or aromatic group, organic acid, anhydride thereof and acid amide such as methylnadic anhydride, dichloromaleic anhydride; maleic amide; itaconic acid; and itaconic anhydride, natural fat and oil such as soybean oil; tung oil; castor oil; linseed oil; hempseed oil; cotton seed oil; sesame oil; rapeseed oil; peanut oil; camellia oil; olive oil; coconut oil; and sardine oil, unsaturated carboxylic acid such as acrylic acid; butenoic acid; crotonic acid; vinylacetic acid; methacrylic acid; pentenoic acid; angelic acid; thebenolic acid; 2-pentenoic acid; 3-pentenoic acid; α-ethylacrylic acid; β-methylcrotonic acid; 4-pentenoic acid; 2-hexenoic acid; 2-methyl-2-pentenoic acid; 3-methyl-2-pentenoic acid; α-ethylcrotonic acid; 2,2-dimethyl-3-butenoic acid; 2-heptenoic acid; 2-octenoic acid; 4-decenoic acid; 9-undecenoic acid; 10-undecenoic acid; 4-dodecenoic acid; 5-dodecenoic acid; 4-tetradecenoic acid; 9-tetradecenoc acid; 9-hexadecenoic acid; 2-octadecenoic acid; 9-octadecenoic acid; eicosenoic acid; docosenoic acid; erucic acid; tetracosenoic acid; myelibainic acid; 2,4-pentadienoic acid; 2,4-hexadienoic acid; diallylacetic acid; geranic acid; 2,4-decadienoic acid; 2,4-dodecadienoic acid; 9,12-hexadecadienoic acid; 9,12-octadecadienoic acid; hexadecatriolefinic acid; linolic acid; linolenic acid; octadecatriolefinic acid; eicosadienoic acid; eicosatriolefinic acid; eicosatetraolefinic acid; ricinolic acid; eleostearic acid; oleic acid; eicosapentaenoic acid; erucinoic acid; docosadienoic acid; docosatriolefinic acid; docosatetraolefinic acid; docosapentaenoic acid; tetracosenoic acid; hexacosenoic acid; hexacodienoic acid; octacosenoic acid; and tetracosenoic acid, and esters thereof, acid amide thereof, anhydride thereof, unsaturated alcohol such as allyl alcohol; crotyl alcohol; methylvinyl carbinol; allyl carbinol; methylpropenyl carbinol; 4-pentene-1-ol; 10-undecane-1-ol; propargyl alcohol; 1,4-pentadiene-3-ol; 1,4-hexadiene-3-ol; 3,5-hexadiene-2-ol; 2,4-hyexadiene-1-ol; hydroxyethyl methacrylate; alcohol represented by the general formula $C_nH_{2n-5}OH$, $C_nH_{2n-7}OH$ or $C_nH_{2n-8}OH$ wherein n denotes a positive integer; 3-butene-1,2-diol; 2,5-dimethyl-3-hexene-2,5-diol; 1,5-hexadiene-3,4-diol; and 2,6-octadiene-4,5-diol, unsaturated amine derived from unsaturated alcohol by substituting $NH_2$ group for OH group, adduct of low polymer, e.g. with an average molecular weight of 500 to 1000, approxy, or adduct of high polymer, e,g. with an average molecular weight of 10,000 or more derived from butadiene, isoprene, etc. with maleic anhydride, phenols or the like; above adduct into which amino group; carboxyl group; hydroxyl group, epoxy group or the like is introduced; and allyl isocyanate.

Examples of vinyl compound having an epoxy group include glycidyl methacrylate; glycidyl acrylate; vinylglycidyl ether; glycidyl ether of hydroxyalkyl (meth)acrylate; glycidyl ether of polyalkyleneglycol (meth)acrylate and glycidyl itaconate, of which glycidyl methacrylate is particularly desirable.

Needless to say, a compound having an unsaturated group and a polar group in the same molecule at the same time includes a compound having same or different and at least two unsaturated groups and/or polar groups, and it is possible to use at least two such compounds.

The terminal-modified styrenic polymer as the component (A) of the present invention can be obtained by bonding a compound having both a polar group and an unsaturated group to the terminal of the above-mentioned styrenic polymer. Various processes are available for the production of the aforementioned styrenic polymer including, for example, a process wherein a styrenic monomer is polymerized in the presence of an inert hydrocarbon solvent or in the absence of a solvent by the use of a catalyst comprizing a titanium compound and an aluminoxane and subsequently a compound having both a polar group and an unsaturated group is added to proceed with reaction. The above-mentioned terminal-modified styrenic polymer may be incorporated with a thermoplastic resin, rubbery elastomer, antioxidant, ultraviolet ray absorber, external lubricant, nucleating agent, antistatic agent, colorant, flame retardant, flame retarding aid or the like as necessary insofar as an object of the present invention is not impaired. Examples of thermoplastic resin include polyolefin such as polyphenylene ether with or without a polar group; polyethylene; atactic polystyrene; polypropylene; polybutene; and polypentene, polyester such as polyethylene terephthalate; polybutylene terephthalate; and polyethylene naphthalate, polythioether such as polyamide; polyphenylene sulfide, polycarbonate; polyarylate; polysulfone; polyether ether keton; polyether sulfone; polyimide; polyamidimide; poly(methyl methacrylate); ethylene/acrylic acid copolymer; acrylonitrile/styrene copolymer; acrylonitrile/chlorinated polyethylene/styrene copolymer; ethylene/vinyl acetate copolymer; ethylene/vinyl alcohol copolymer; acrylonitrile/butadiene/styrene copolymer; vinyl chloride resin; chlorinated polyethylene; fluorinated polyethylene; polyacetal; thermoplastic urethane elastomer; 1,2-polybutadiene; and styrene/maleic anhydride copolymer. Examples of preferable thermoplastic resin include those having affinity or reactivity with the polar group exemplified by polyolefin such as polyethylene; polypropylene; polybutene; and polypentene, polyester such as polyphenylene sulfide; polyamide; polyamidimide; polyethylene terephthalate; polybutylene terephthalate; polyethylene naphthalate; polycarbonate; polyarylate; polysulfone; polyether ether ketone; polyether sulfone; polyimide; poly(methyl methacrylate); ethylene/acrylic aicd copolymer; acrylonitrile/styrene copolymer; acrylonitrile/chlorinated polyethylene/styrene copolymer; ethylene/vinyl acetate copolymer; ethylene/vinyl acetate copolymer; ethylene/vinyl alcohol copolymer; acrylonitrile/butadiene/styrene copolymer; polyacetal; styrene/maleic anhydride copolymer, each being produced by introducing a compound having both a polar group and an unsaturated group through melt reaction, solution reaction or polymerization. Examples of particularly desirable thermoplastic resin include maleic acid-modified polyethylene; polypropylene; styrene/maleic anhydride copolymer; polyarylate; polycarbonate; epoxy group-containing polyphenylene sulfide; amino group-containing polyphenylene sulfide; and polyamide.

As polyamide mentioned above, all of the known thermoplastic polyamides are usable. Examples of suitable amides include polyamide-4; polyamide-6; polyamide-4,6; polyamide-6,6; polyamide-3,4; polyamide-12; polyamide-11; polyamide-6,10; polyamide refined from terephthalic acid and 4,4'-diaminocyclohexylmethane; azelaic acid; polyamide refined from adipic acid and 2,2-bis(p-aminocyclohexyl)propane; polyamide refined from adipic acid and m-xylylenediamine; and polyamide refined from terephthalic acid and trimethylhexamethylenediamine. An aromatic polyamide resin is a polyamide polymer containing an amide bond having an aromatic ring in the main chain as the repeating unit. Specifically, the aromatic polyamide resin to be used in the present invention is suitably selected for use from the polymer obtained by reacting an aromatic diamine component with a dicarboxylic acid component by a conventional process and the polymer obtained by reacting an aromatic w-amino-w'-carboxylic compound by a conventional process.

As the aromatic diamine components, there are used the diamine compounds each having a benzene ring, typicallty exemplified by 1,4-diaminobenzene; 1,3-diaminobenzene; 1,2-diaminobenzene; 2,4-diaminotoluene; 2,3-diaminotoluene; 2,5-diaminotoluene; 2,6-diaminotoluene; ortho-, meta- or para-xylylenediamine; ortho-, meta- or para-2,2'-diaminodiethylbenzene; 4,4'-diaminobiphenyl; 4,4'-diaminodiphenylmethane; 4,4'-diaminodiphenyl ether; 4,4'-diaminodiphenyl thioether; 4,4'-diaminodiphenyl ketone and 4,4'-diaminodiphenylsulfone. The above-mentioned diamine compound having a benzene ring may be used alone or in combination with other diamine compound/s such as an aliphatic diamine so long as the content of the aromatic diamine component is not less than 50 mol %. Needless to say, two or more kinds of the aromatic diamines may be used as a mixture.

As the dicarboxylic acid, mention may be made of aliphatic dicarboxyl compound exemplified by glutaric acid; adipic acid; pimelic acid; suberic acid; azelic acid and sebacic acid, aromatic dicarboxyl compound exemplified by isophthalic acid; terephthalic acid; and naphthalenedicarboxylic acid and hydrochlorides of the aforesaid dicarboxyl compounds. The above-mentioned compound may be used in combination with at least one other compound.

As the $\omega$-amino-$\omega$'-carboxyl compound having an aromatic ring, mention may be made of 4-aminophenylcarboxymethane; 1-(4-aminophenyl)-2-carboxyethane; 3-(4-aminophenyl)-1-carboxypropane; and p-(3-amino-3'-hydroxy)dipropylbenzene. The aromatic polyamide resin to be used in the present invention is desirably a polyamide derived from a diamine compound having a benzene ring and an aliphatic dicarboxylic acid, more desirably a polyamide derived from xylylenediamine and adipic acid, most desirably a polyamide derived from m-xylylenediamine and adipic acid.

There are available a variety of rubbery elastomers, of which is most suitable a rubbery copolymer containing a styrenic compound as one of the components. Examples thereof include styrene/butadiene copolymer rubber (SBR); styrene/butadiene block copolymer (SB, SBS, BSB, etc.); styrene/hydrogenated butadiene block copolymer (SEBS, SEB, etc.); styrene/isoprene block copolymer (SI, SIS, ISI, etc); styrene/hydrogenated isoprene block copolymer (SEP, SEPS, etc.); granular elastomer obtained by polymerizing a vinylic monomer in the presence of a polymer obtained by polymerizing at least one monomer selected from the group consisting of alkyl methacrylate and polyfunctional monomer having a conjugated diene type unsaturated group, said elastomer being exemplified by acrylonitrile/styrene-grafted butadiene rubber (ABS); acrylonitrile/styrene-grafted butadiene/butyl acrylate rubber (AABS); methyl methacrylate/styrene-grafted butyl acrylate rubber (MAS); styrene-grafted butadiene rubber (SB); methyl methacrtylate/styrene-grafted butadiene rubber (MBS); methyl methacrylate/styrene-grafted butadiene/butyl acrylate copolymer rubber (MABS).

Other examples of rubbery elastomers include at least one block or graft copolymer selected from A-B block copolymer, A-grafted B copolymer and B-grafted A copolymer wherein A indicates at least one styrenic polymer or styrenic copolymer selected from the group consisting of atactic polystyrene; acrylonitrile/styrene random copolymer; styrene/maleic anhydride random copolymer; styrene/acrylonitrile/maleimide anhydride random copolymer; styrene/methyl methacrylate random copolymer; and styrene/methacrylic acid random copolymer, and B stands for at least one polymer selected from the group consisting of polybutadiene; polyisoprene; hydrogenated polybutadiene; hydrogenated polyisoprene; polycarbonate; polyamide; poly(methyl methacrylate); polyethylene terephthalate; and polybutylene terephthalate.

Still other examples of rubbery elastomers include natural rubber; polybutadiene; polyisoprene; polyisobutylene; neoprene; ethylene/propylene copolymer rubber; polysulfide rubber; Thiokol rubber; acrylic rubber; urethane rubber; silicone rubber; and epichlorohydrin rubber.

As rubbery elastomers, a modified rubbery elastomer obtained by the reaction with a compound having a polar group and an unsaturated group may be employed as well.

As the component (A) of the present invention, the aforestated terminal-modified styrenic polymer may be employed alone or in combination with a terminal-unmodified styrenic polymer, that is, at least one terminal-unmodified styrenic polymer having syndiotactic configuration, which may be a combination of two are more species. The compositional ratio of the terminal-mnodified styrenic polymer to the terminal-unmodified styrenic polymer may be arbitrarily selected insofar as the former is contained in the component (A).

As the component (B) of the present invention, a wide diversity of inorganic fillers in the form of fiber, granule, powder or the like are available.

Examples of fibrous filler include glass fiber, carbon fiber, whisker, ceramics fiber and metallic fiber, more specifically, boron; alumina; silica; and silicon carbide as whisker, gypsum; potassium titanate; magnesium sulfate; and magnesium oxide as ceramics fiber, copper; aluminum; and steel as metallic fiber. Among them are particularly desirable glass fiber including glass filament, glass fiber, glass roving and glass mat, and carbon fiber. The form or shape of the filler includes cloth, mat, bound and cut fiber, short fiber, filament and whisker. The bound and cut fiber has preferably a length of 0.05 to 50 mm and a diameter of 5 to 20 $\mu$m. As carbon fiber, that of polyacrylonitrile-based (PAN) is preferable. The cloth or mat has a length of 1 mm or more, preferably 5 mm or more.

Examples of granular or powdery filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead. Talc has desirably an average grain size of 0.8 to 20 $\mu$m, more desirabuly 0.6 to 10 $\mu$m. Calcium carbonate has desirably an average grain size of 40 to 250 $\mu$m, more desirably 50 to 150 $\mu$m.

The glass fiber is preferably surface-treated by a surface treatment agent. The use of an inorganic filler which is surface-treated allows a polar group of a terminal-modified styrenic polymer to react with an unsaturated group of the same, thereby enhancing the adhesivity between the filler and polymer.

The purpose of a coupling agent to be used for the surface treatment of aforestated glass fiber as the filler is to improve the adhesivity between the filler and the terminal-modified styrenic polymer as the component (A) of the present invention. The coupling agent may be suitably selected for use from the publicly known silane-based coupling agent and titanium-based coupling agent. Examples of the silane-based coupling agent include triethoxysilane, vinyltris($\beta$-methoxyethoxy)silane, $\gamma$-methacryloxypropyltrimethoxysilane, $\gamma$-glycidoxypropyltrimethoxysilane, $\beta$-(1,1-epoxycyclohexyl)ethyltrimethoxysilane, n-$\beta$-(aminoethyl)-$\gamma$-aminopropyltrimethoxysilane, N-$\beta$-(aminoethyl)-$\gamma$-aminopropylmethyl dimethoxysilane, $\gamma$-aminopropyltriethoxysilane, N-phenyl-$\gamma$-aminopropyltrimethoxysilane, $\gamma$-mercaptopropyltrimethoxysilane, $\gamma$-chloropropyltrimethoxysilane, $\gamma$-aminopropyltrimethoxysilane, $\gamma$-aminopropyl-tris(2- methoxy-ethoxy)silane, N-methyl-$\gamma$-aminopropyltrimethoxysilane, N-vinylbenzyl-$\gamma$-aminopropyltriethoxysilane, triaminopropyltrimethoxysilane, 3-ureidopropyltrimethoxy-silane, 3-4,5-dihydroimidazolepropyltriethoxysilane, hexamethyldisilazane, N,O-(bistrimethylsilyl)amide and N,N-bis(trimethylsilyl)urea. Among them are desirable aminosilane and epoxysilane such as $\gamma$-aminopropyltriethoxysilane, N-$\beta$-(aminoethyl)-$\gamma$-aminopropyltriethoxysilane, $\gamma$-glycidoxypropyltrimethoxysilane, $\beta$-(3,4-epoxycyclohexyl)ethyltrimethoxysilane. Among them the above-mentioned amino silanes are particularly desirable.

Specific examples of the titanium-based coupling agent include isopropyltriisostearoyl titanate, isopropyltridodecylbenzenesulfonyl titanate, isopropyltris(dioctylpyrophosphate) titanate, tetraisopropylbis(-dioctylphosphite) titanate, tetraoctylbis(di-tridecylphosphite) titanate, tetrta(1,1-diallyloxymethyl-1-butyl)bis(di-tridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacrylate titanate, isopropyltri(dioctylphosphate) titanate, isopropyltricumylphenyl titanate, isopropyltri(N-amidoethyl-aminoethyl) titanate, dicumylphenyloxyacetate titanate and di-isostearoylethylene titanate, among which isopropyltri(N-amidoethylaminoethyl) titanate is desirable.

The surface treatment of the above-mentioned filler by the use of such coupling agent can be effected by a conventional known method without specific limitation, for example, sizing treatment in which the filler is coated with the sizing agent in the form of solution of the coupling agent as mentioned above in an organic solvent or in the form of suspension containing the coupling agent; dry blending by the use of a Henschel mixer, super mixer, Ready-gel mixer, V-type blender or the like; spraying method; integral blending; dry concentration or the like, each being suitably selected according to the form and shape of the filler to be used. The surface treatment is, however, preferably carried out by means of sizing treatment, dry blending, spraying or the like.

In combination with the aforementioned coupling agent, a film forming substance for glass may be used without specific limitation and is exemplified by the polymer such as polyester-based, urethane-based, acrylic and vinyl acetate-based polymers.

The amount of the above-mentioned inorganic filler to be used as the component (B) of the present invention is 1 to 350, preferably 5 to 200, more preferably 5 to 100 parts by weight per 100 parts by weight of the foregoing component (A). An amount of the filler less than 1 part by weight results in insufficient effect on heat resistance, rigidity, impact resistance and the like, whereas that exceeding 350 parts by weight leads to the disadvantage of poor dipersion and difficulty in molding.

In addition to the aforestated inorganic filler, an organic filler may be added to the composition of the present invention and is exemplified by organic synthetic fiber, natural vegetable fiber etc., more specifically by totally aromatic polyamide fiber, polyimide fiber and the like.

In the production of the thermoplastic resin according to the present invention, the compounding of the above-described components may be carried out by various known methods including (1) melt kneading, (2) a method wherein a sheet formed from the terminal-modified styrenic polymer or a composition thereof and a glass mat are laminated followed by melting, (3) a method wherein the terminal-modified styrenic polymer and an inorganic filler in the form of long fiber are mixed in a liquid to form a slurry, and after settling, are heated.

As described hereinbefore, the thermoplastic resin composition according to the present invention is excellent in resistances to water, impact and heat as well as mechanical properties, and is expected to find a wide variety of effective utilization as industrial materials such as electric and electronic materials, industrial construction materials, automobile parts, domestic electrical appliances and various machine parts.

Examples of the automobile parts to which the thermoplastic resin composition of the present invention can be applied include a wide diversity of parts such as acoustic barrier, accel pedal, arm rest, A/T shaft base, ignition trans-case, intake manifold, inner panel upper, inner panel lower, intercooler protect, water pump pulley, air guide, air surge tank, air duct, air deflector, air cleaner cover, air conditioner heater adaptor, L-side cover, engine undercover, engineer noise-proof plate, oil filler pipe, oil pan (oil sump), grille assist, compartment hatch, compartment door, go-cart chassis, tire wheel, distributor cap, tail gate inner panel, electric parts case, door beam, tono cover, transmission cover, transmission console, truck fan shroud, truck step, torque change cover, tor-con bracket, sound shield, sun-roof tray, sun-roof shade, seat, seat cushion, seat belt retractor, seat shell, seal side gate, spare tire case, stone guard, splash cover, pillar for inner/outer layer, neebol star, full tank cover, package tray, bagwell (golf cart), battery tray, battery box cover, valve cover, handle core, handle lever, bumper beam, heat shield, fan shroud fender extension, floor tray, floor deck, floor panel support, front end retainer, front seat shell, brake pedal, break cover, brake air scoop, brake sleeve, brake lever, fender seal, fender, fender apron, head lamp support, head lamp reflector, pedal box, pedal lump reflector, wheel cover, wheel cap, mat set cover, license plate bracket, radiator end tank, radiator support beam, radiator fan support, lamp housing, lamp bracket, lamp assembly, rear parcel shelf, rear spoiler, load floor, rocker panel and wiper motor case.

Examples of application in addition to the above include entry door, snow board, various trays, chair, container, pallet, acess floor (house roof), cable splice cover, welding mask, various helmets, box, housing, large-capacity computer panel, jack holder, seat back, seat base, splash guard, step, hose band, window handle, ski binding, chain-saw gear, trans-erector housing, fuse housing, motor parts, pump parts, oil server, print board, connector, relay, timer, coil bobbin, deflection yoke, chassis for OA, AV machinery, microwave oven-related parts, thermal apparatus parts, water heater parts and concrete frame plate.

In the following, the present invention will be described in more detail with reference to the non-limitative examples and comparative examples.

Reference Example 1

In a 500 ml glass vessel which had been purged with argon were placed 200 ml of toluene, 17.0 g (71 mmol) of copper sulfate pentahydrate ($CuSO_4.5H_2O$) and 24 ml (250 mmol) of trimethylaluminum, which were then reacted at 40° C. for 8 hours. Then, the solids were separated from the reaction mixture to obtain 6.7 g of a contact product. The molecular weight thereof as determined by the freezing point depression method was 610.

Preparation Example 1

In a 2 L (L=leter) reaction vessel were placed 1 L of purified styrene, the contact product as obtained in the above Reference Example 1 in an amount of 7.5 mmol as aluminum atom, 7.5 mmol of triisobutylaluminum and 0.038 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 466 g of polymer. As the result of analysis by gel permeation chromatography using 1,2,4-trichlorobenzene at 135° C. as the solvent, the polymer thus produced had a weight-average molecular weight of 290,000 and a ratio of weight-average molecular weight to number-average molecular weight of 2.72.

It was confirmed that the polymer was polystyrene having syndiotactic configuration (SPS) from the results of melting point measurement and $^{13}C$-NMR analysis using carbon isotope.

Preparation Example 2

In a 2 L reaction vessel were placed 1.2 L of purified styrene, the contact product as obtained in the above Reference Example 1 in an amount of 5 mmol as aluminum atom, 5 mmol of triisobutylaluminum and 0.025 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 308 g of polymer. As the result of analysis by gel permeation chromatography using 1,2,4-trichlorobenzene at 135° C. as the solvent, the polymer thus produced had a weight-average molecular weight of 389,000 and a ratio of weight-average molecular weight to number-average molecular weight of 2.64.

It was confirmed that the polymer was polystyrene having syndiotactic configuration (SPS) from the results of melting point measurement and $^{13}C$-NMR analysis using carbon isotope.

Preparation Example 3

In a 2 L reaction vessel were placed 1.2 L of purified styrene, 2.4 L of toluene, the contact product as obtained in the above Reference Example 1 in an amount of 30 mmol as aluminum atom, 30 mmol of triisobutylaluminum and 0.15 mmol of pentamethylcyclopentadienyltitanium trimethoxide, which were then subjected to polymerization reaction at 80° C. for 1 hour. After the completion of the reaction, the catalytic components were decomposed with a solution of hydrochloric acid in methanol and then the reaction product was washed with methanol repeatedly and dried to afford 630 g of plymer. As the result of analysis by gel permeation chromatography using 1,2,4-trichlorobenzene at 135° C. as the solvent, the polymer thus produced had a weight-average molecular weight of 252,000 and a ratio of weight-average molecular weight to number-average molecular weight of 2.54.

It was confirmed that the polymer was polystyrene having syndiotactic configuration (SPS) from the results of melting point measurement and $^{13}$C-NMR analysis using carbon isotope.

Preparation Example 4

In a 5 L reaction vessel were placed 1.2 L of purified styrene, 2.4 L of toluene, the contact product as obtained in the above Reference Example 1 in an amount of 30 mmol as aluminum atom, 30 mmol of triisobutylaluminum and 0.15 mmol of pentamethylcyclopentadienyltitanium trimethoxide, which were then subjected to polymerization reaction at 80° C. for 1 hour. Subsequently 50 ml of glycidyl methacrylate was added to the reaction system to proceed with polymerization reaction at 80° C. for 1 hour. After the completion of the reaction, the catalytic components were decomposed with a solution of hydrochloric acid in methanol and then the reaction product was washed with methanol repeatedly and dried to afford 630 g of polymer. As the result of analysis by gel permeation chromatography using 1,2,4-trichlorobenzene at 135° C. as the solvent, the polymer thus produced had a weight-average molecular weight of 253,000 and a ratio of weight-average molecular weight to number-average molecular weight of 2.60.

It was confirmed that the polymer was polystyrene having syndiotactic configuration (SPS) from the results of melting point measurement and $^{13}$C-NMR analysis using carbon isotope. Further it was confirmed that the polymer was SPS the terminal of which was modified with glycidyl methacrylate (SPS-GMA), since carbonyl absorption was observed as the result of IR analysis of the polymer and the molecular weight thereof remained substantially unchanged compared with that in Preparation Example 3.

Preparation Example 5

In a 5 L reaction vessel were placed 1.2 L of purified styrene, 2.4 L of toluene, the contact product as obtained in the above Reference Exammple 1 in an amount of 30 mmol as aluminum atom, 30 mmol of triisobutylaluminum and 0.15 mmol of pentamethylcyclopentadienyltitanium tirimethoxide, which were then subjected to polymerization reaction at 80° C. for 1 hour. Subsequently 50 g of maleic anhydride was added to the reaction system to proceed with polymerization reaction at 80° C. for 1 hour. After the completion of the reaction, the catalytic components were decomposed with a solution of hydrochloric acid in methanol and then the reaction product was washed with methanol repeatedly and dried to afford 646 g of polymer. As the result of analysis by gel permeation chromatography using 1,2,4-trichlorobenzene at 135° C. as the solvent, the polymer thus produced had a weight-average molecular weight of 270,000 and a ratio of weight-average molecular weight to number-average molecular weight of 2.62.

It was confirmed that the polymer was polystyrene having syndiotactic configuration (SPS) from the results of melting point measurement and $^{13}$C-NMR analysis using carbon isotope. Further it was confirmed that the polymer was SPS the terminal of which was modified with maleic anhydride (SPS-MA), since carbonyl absorption was observed as the result of IR analysis of the polymer and the molecular weight thereof remained substantially unchanged compared with that in Preparation Example 3.

EXAMPLE 1

To 100 parts by weight of SPS-GMA obtained in Preparation Example 4 were added 0.1 part by weight of (2,6-di-tert-butyl-4-methylphenyl)pentaerythritol diphosphite (produced by Adeka Argus Co., Ltd. under the tradename "PEP-36"), 0.1 part by weight of tetrakis[methylene-3-(3',5'-di-tert-butyl-4'-hydroxyphenyl)]propionate (produced by Adeka Argus Co., Ltd. under the tradename "MARK AO 60" as an antioxidant) and one (1) part by weight of p-(tert-butyl)aluminum benzoate (produced by Dainippon Ink & Chemicals, Inc. under the tradename "PTBBA-A1") as a nucleating agent, and dry blended with a Henschel mixer. Subsequently the mixture was incorporated with 43 parts by weight of aminosilane-treated glass fiber (produced by Japan Electric Glass Co., Ltd. under the tradename "03T-488" 13 μm/3 mm) by side feeding and pelletized with a twin-screw kneader. The pellet was injection molded to produce test pieces for bending test, Izod impact test and heat distortion test. The test results are given in Table 2.

EXAMPLE 2

To 50 parts by weight of SPS-GMA obtained in Preparation Example 4 and 50 parts by weight of SPS obtained in Preparation Example 1 making a total of 100 parts by weight were added 0.1 part by weight of (2,6-di-tert-buty]-4-methylphenyl)pentaerythritol diphosphite (produced by Adeka Argus Co., Ltd. under the tradename "PEP-36"), 0.1 part by weight of tetrakis[methylene-3-(3',5'-di-tert-butyl-4'-hydroxyphenyl)]propionate (produced by Adeka Argus Co., Ltd. under the tradename "MARK AO 60" as an antioxidant) and one (1) part by weight of p-(tert-butyl)aluminum benzoate (produced by Dainippon Ink & Chemicals, Inc. under the tradename "PTBBA-A1") as a nucleating agent, and dry blended with a Henschel mixer. Subsequently the mixture was incorporated with 43 parts by weight of aminosilane-treated glass fiber (produced by Japan Electric Glass Co., Ltd. under the tradename "03T-488" 13 μm/3 mm) by side feeding and pelletized with a twin-screw kneader. The pellet was injection molded to produce test pieces for bending test, Izod impact test and heat distortion test. The test results are given in Table 2.

EXAMPLE 3

To 10 parts by weight of SPS-MA obtained in Preparation Example 5 and 90 parts by weight of SPS obtained in Preparation Example 1 making a total of 100 parts by weight were added 0.1 part by weight of (2,6-di-tert-butyl-4-methylphenyl)pentaerythritol diphosphite (produced by Adeka Argus Co., Ltd. under the tradename "PEP-36"), 0.1 part by weight of tetrakis[methylene-3-(3'5'-di-tert-butyl-4'-hydroxyphenyl)]propionate (produced by Adeka Argus Co., Ltd. under the tradename "MARK AO 60" as an antioxidant) and one (1) part by weight of p-(tert-butyl)aluminum benzoate (produced by Dainippon Ink & Chemicals, Inc. under the tradename "PTBBA-A1") as a nucleating agent, and dry blended with a Henschel mixer. Subsequently the mixture was incorporated with 43 parts by weight of aminoxilane-treated glass fiber (produced by Japan Electric Glass Co., Ltd. under the tradename "03T488" 13 μm/3 mm) by side feeding and pelletized with a twin-screw kneader. The pellet was injection molded to produce test pieces for bending test, Izod impact test and heat distortion test. The test results are given in Table 2.

EXAMPLE 4

To 5 parts by weight of SPS-MA obtained in Preparation Example 5 and 95 parts by weight of SPS obtained in Preparation Example 1 making a total of 100 parts by weight were added 0.1 part by weight of (2,6-di-tert-butyl-4-methylphenyl)pentaerythritol diphosphite (produced by Adeka Argus Co., Ltd. under the tradename "PEP-36"), 0.1 part by weight of tetrakis[methylene-3-(3′,5′-di-tert-butyl-4′-hydroxyphenyl)]propionate (produced by Adeka Argus Co., Ltd. under the tradename "MARK AO 60" as an antioxidant) and one (1) part by weight of p-(tert-butyl)aluminum benzoate (produced by Dainippon Ink & Chemicals, Inc. under the tradename "PTBBA-A1") as a nucleating agent, and dry blended with a Henschel mixer. subsequently the mixture was incorporated with 43 parts by weight of aminosilane-treated glass fiber (produced by Japan Electric Glass Co., Ltd. under the tradename "03T-488" 13 μm/3 mm) by side feeding and pelletized with a twin-screw kneader. The pellet was injection molded to produce test pieces for bending test, Izod impact test and heat distortion test. The test results are given in Table 2.

Examples 5 to 8 and Comparative Example 1 to 6

The procedure in Example 1 was repeated except that the components and amounts in Table 1 were used. The pellet obtained was injection molded to produce test pieces for bending test, Izod impact test and heat distortion test. The test results are given in Table 2.

TABLE 1

| | Component (A) (100 parts by weight) | | | |
|---|---|---|---|---|
| | species | parts by weight | species | parts by weight |
| Example 1 | Preparation Example 1 | 0 | Preparation Example 4 | 100 |
| Example 2 | Preparation Example 1 | 50 | Preparation Example 4 | 50 |
| Example 3 | Preparation Example 1 | 90 | Preparation Example 5 | 10 |
| Example 4 | Preparation Example 1 | 95 | Preparation Example 5 | 5 |
| Example 5 | Preparation Example 1 | 0 | Preparation Example 4 | 100 |
| Example 6 | Preparation Example 1 | 0 | Preparation Example 4 | 100 |
| Example 7 | Preparation Example 1 | 90 | Preparation Example 5 | 10 |
| Example 8 | Preparation Example 1 | 90 | Preparation Example 5 | 10 |
| Comparative Example 1 | Preparation Example 1 | 100 | — | — |
| Comparative Example 2 | Preparation Example 1 | 99.9 | CP1005S | 0.1 |
| Comparative Example 3 | Preparation Example 1 | 99 | CP1005S | 1 |
| Comparative Example 4 | Preparation Example 1 | 95 | CP1005S | 5 |
| Comparative Example 5 | Preparation Example 1 | 90 | CP1005S | 10 |
| Comparative Example 6 | Preparation Example 1 | 95 | SMA | 5 |

| | Component (B) | | Nucleating agent | |
|---|---|---|---|---|
| | fibrous filler | parts by weight | species | parts by weight |
| Example 1 | chopped* strand | 43 | PTBBA-A1 | 1 |
| Example 2 | chopped* strand | 43 | PTBBA-A1 | 1 |
| Example 3 | chopped* strand | 43 | PTBBA-A1 | 1 |
| Example 4 | chopped* strand | 43 | PTBBA-A1 | 1 |
| Example 5 | chopped* strand | 10 | PTBBA-A1 | 1 |
| Example 6 | chopped* strand | 70 | PTBBA-A1 | 1 |
| Example 7 | chopped* strand | 10 | PTBBA-A1 | 1 |
| Example 8 | chopped* strand | 70 | PTBBA-A1 | 1 |
| Comparative Example 1 | chopped* strand | 43 | PTBBA-A1 | 1 |
| Comparative Example 2 | chopped* strand | 43 | PTBBA-A1 | 1 |
| Comparative Example 3 | chopped* strand | 43 | PTBBA-A1 | — |
| Comparative Example 4 | chopped* strand | 43 | PTBBA-A1 | 1 |
| Comparative Example 5 | chopped* strand | 43 | PTBBA-A1 | 1 |
| Comparative Example 6 | chopped* strand | 43 | PTBBA-A1 | 1 |

| | Antioxidant | | | |
|---|---|---|---|---|
| | (1) | weight | (2) | weight |
| Example 1 | PEP-36 | 0.1 | MARK AO 60 | 0.1 |
| Example 2 | PEP-36 | 0.1 | MARK AO 60 | 0.1 |
| Example 3 | PEP-36 | 0.1 | MARK AO 60 | 0.1 |
| Example 4 | PEP-36 | 0.1 | MARK AO 60 | 0.1 |
| Example 5 | PEP-36 | 0.1 | MARK AO 60 | 0.1 |
| Example 6 | PEP-36 | 0.1 | MARK AO 60 | 0.1 |
| Example 7 | PEP-36 | 0.1 | MARK AO 60 | 0.1 |
| Example 8 | PEP-36 | 0.1 | MARK AO 60 | 0.1 |
| Comparative Example 1 | PEP-36 | 0.1 | MARK AO 60 | 0.1 |
| Comparative Example 2 | PEP-36 | 0.1 | MARK AO 60 | 0.1 |
| Comparative Example 3 | PEP-36 | 0.1 | MARK AO 60 | 0.1 |
| Comparative Example 4 | PEP-36 | 0.1 | MARK AO 60 | 0.1 |
| Comparative Example 5 | PEP-36 | 0.1 | MARK AO 60 | 0.1 |
| Comparative Example 6 | PEP-36 | 0.1 | MARK AO 60 | 0.1 |

CP1005S: Styrene/glycidyl methacrylate (5 mol %) copolymer Tradename: Plenmer CP1005S Produced by Nippon Oils and Fats Co., Ltd. Weight-average molecular weight: $10 \times 10^4$
SMA: Styrene/maleic anhydride (14 mol %) copolymer Tradename: Moremax UG 830 Produced by Idemitsu Petrochemical Co., Ltd. Weight-average molecular weight: $28 \times 10^4$
*aminosilan treatment 13 μm/3 mm chopped strand

TABLE 2

| | Izod impact strength (with notch) (kg/cm/cm) | Flexural strength (kg/cm²) | Flexural modulus of elasticity (kg/cm²) | Heat distortion temperature (°C.) |
|---|---|---|---|---|
| Example 1 | 10.1 | 1700 | 125000 | 263 |
| Example 2 | 7.3 | 1560 | 107000 | 260 |
| Example 3 | 10.5 | 1710 | 129000 | 263 |
| Example 4 | 9.8 | 1700 | 125000 | 262 |
| Example 5 | 9.1 | 1530 | 91000 | 253 |
| Example 6 | 8.3 | 1980 | 157000 | 260 |
| Example 7 | 8.5 | 1450 | 86000 | 252 |
| Example 8 | 8.8 | 2000 | 148000 | 261 |
| Comparative Example 1 | 5.3 | 1420 | 85000 | 242 |
| Comparative Example 2 | 10.4 | 1540 | 123000 | 251 |
| Comparative Example 3 | 8.6 | 1630 | 115000 | 250 |
| Compar- | 9.5 | 1650 | 115000 | 249 |

TABLE 2-continued

|  | Izod impact strength (with notch) (kg/cm/cm) | Flexural strength (kg/cm²) | Flexural modulus of elasticity (kg/cm²) | Heat distortion temperature (°C.) |
|---|---|---|---|---|
| ative Example 4 | | | | |
| Comparative Example 5 | 9.9 | 1680 | 110000 | 253 |
| Comparative Example 6 | 5.5 | 1310 | 103000 | 243 |

The above-mentioned tests were carried out under the following conditions:
Izod test (with notch): according to JIS-K-7110
Flexural strength test: according to JIS-K-7203
Flexural modulus of elasticity test: according to JIS-K-7203
Heat distortion temperature: according to JIS-K-7207

What is claimed is:

1. A thermoplastic resin composition which comprises 100 parts by weight of (A) a terminally-modified styrenic polymer having syndiotactic configuration, and having bonded as terminal modification solely to the terminal ends of the styrenic polymer having syndiotactic configuration a compound having both a polar group and a carbon-carbon double bond or a carbon-carbon triple bond and 1 to 350 parts by weight of (B) an inorganic filler.

2. The composition according to claim 1, wherein said thermoplastic resin composition further comprises a styrenic polymer having syndiotactic configuration.

3. The composition according to claim 1, wherein said component (B) is contained in an amount of 5 to 200 parts by weight.

4. The composition according to claim 1, wherein said compound is at least one compound selected from the group consisting of unsaturated carboxylic acid, unsaturated carboxylic acid anhydride, unsaturated epoxy compound, unsaturated alcohol, unsaturated amine and unsaturated isocyanic acid ester.

5. The composition according to claim 4, wherein said compound is glycidyl methacrylate.

6. The composition according to claim 4, wherein said compound is maleic anhydride.

7. The composition according to claim 1 further comprising a thermoplastic resin other than said component (A).

8. The composition according to claim 1, further comprising a rubbery elastomer.

9. The composition according to claim 1, wherein said component (B) is glass fiber or carbon fiber.

10. The composition according to claim 9, wherein said component (B) is glass fiber the surface of which is treated with a surface treatment agent.

11. The composition according to claim 10, wherein said surface treatment agent is selected from silane-based coupling agent and titanium-based coupling agent.

12. The composition according to claim 11, wherein said silane-based coupling agent is aminosilane.

13. The composition according to claim 1, further comprising an organic filler in addition to said component (B).

14. The thermoplastic resin of claim 1 wherein the compound is bonded to the styrenic polymer having syndiotactic configuration by addition of the compound to the styrenic polymer having syndiotactic configuration in the presence of the catalyst employed for polymerizing the styrenic-monomer required to prepare the styrenic polymer.

15. The thermoplastic resin of claim 14 wherein the styrenic polymer having syndiotactic configuration to which the compound is bonded is polystyrene having syndiotactic configuration.

16. A composition according to claim 8 further comprising a styrenic polymer having syndiotactic configuration.

* * * * *